(12) United States Patent
Little

(10) Patent No.: US 8,413,062 B1
(45) Date of Patent: Apr. 2, 2013

(54) METHOD AND SYSTEM FOR ACCESSING INTERFACE DESIGN ELEMENTS VIA A WIREFRAME MOCK-UP

(75) Inventor: Joshua Ambrose Little, Trenton, NJ (US)

(73) Assignee: Infragistics Inc., East Windsor, NJ (US)

( * ) Notice: Subject to any disclaimer, the term of this patent is extended or adjusted under 35 U.S.C. 154(b) by 289 days.

(21) Appl. No.: 12/590,418

(22) Filed: Nov. 6, 2009

(51) Int. Cl.
*G06F 3/00* (2006.01)
*G06F 3/048* (2006.01)
*G06F 9/44* (2006.01)

(52) U.S. Cl. .................. 715/762; 715/764; 717/120

(58) Field of Classification Search .......... 715/762, 715/764; 717/120
See application file for complete search history.

(56) References Cited

U.S. PATENT DOCUMENTS

| | | | | |
|---|---|---|---|---|
| 7,430,723 | B2 * | 9/2008 | Nolte et al. ............ | 715/764 |
| 7,565,650 | B2 * | 7/2009 | Bhogal ................ | 717/178 |
| 7,954,091 | B2 * | 5/2011 | Li et al. ............... | 717/135 |
| 8,015,039 | B2 * | 9/2011 | Brunswig et al. ........ | 705/7.11 |
| 2004/0010772 | A1 * | 1/2004 | McKenna et al. ........ | 717/101 |
| 2004/0027378 | A1 * | 2/2004 | Hays et al. ........... | 345/763 |
| 2004/0064805 | A1 * | 4/2004 | Sparago et al. ........ | 717/120 |
| 2006/0156279 | A1 * | 7/2006 | Nelson et al. .......... | 717/104 |
| 2011/0023017 | A1 * | 1/2011 | Calvin ............... | 717/120 |
| 2012/0166978 | A1 * | 6/2012 | Singh et al. .......... | 715/762 |

OTHER PUBLICATIONS

"Yahoo! Design Pattern Library," Copyright © 2009 Yahoo! Inc. Downloaded from web site http://developer.yahoo.com/ypatterns/ on Dec. 9, 2009.

* cited by examiner

*Primary Examiner* — David Phantana Angkool
(74) *Attorney, Agent, or Firm* — Moser Taboada

(57) ABSTRACT

A computer implemented method and system for accessing interface design elements via a wireframe mock-up. The method comprises accessing element information describing one or more design elements, determining a location for one or more element links to be placed on a wireframe mock-up, populating the wireframe mock-up with the one or more element links, and providing the populated wireframe mock-up as an interface to access one or more design elements contained within the design element repository. The location is determined from the element information and the element link is placed in the determined location.

15 Claims, 4 Drawing Sheets

METHOD AND SYSTEM FOR ACCESSING INTERFACE DESIGN ELEMENTS VIA A WIREFRAME MOCK-UP

BACKGROUND OF THE INVENTION

1. Field of the Invention

Embodiments of the present invention generally relate to computer data interfaces and, more particularly, to a method and apparatus for accessing design elements via a wireframe map.

2. Description of the Related Art

One of the most significant effects of widespread internet access and inexpensive personal computers is unprecedented access to information. Home networks are commonplace, applications exist for nearly every day-to-day activity, and the Internet is an integral component of commerce, leisure, and government. A core component of an application or website is the user interface. Unlike mediums such as television or radio, the presentation of the content of an application or website is defined by the content creator, rather than the display medium. Computers offer the user a completely interactive experience that is defined by the interface provided by the content creator.

The wide range of interface design options present the content creator with a dizzying array of choices for the display, control, and access of data within his work. Programmable controls and interfaces ensure that the content creator is only limited by his creativity and expertise.

However, the art of interface design is still relatively new. The knowledge of how to technically implement a particular control within an interface does not always equate to an efficient or aesthetically pleasing interface. Websites and applications that are designed with inadequate tools are often difficult to interact with or counterintuitive, resulting in wasted time and frustrated users.

To combat these problems, different design paradigms have been developed. Control, style, or design pattern suites may be provided to assist the content creator. To catalogue these pattern suites, various resources have emerged. Websites may contain databases listing these patterns alphabetically, or by their type, or by their screen location.

None of these methods allow the interface designer to view these suites in a natural manner, as they would be used in an interface. Traditional lists and indexes of design elements lack context, making it difficult to see how a given design component would fit with a particular page. It would be advantageous to provide a way to access these design components in a natural, visual manner. Therefore, there is a need in the art for a method and apparatus for viewing interface design elements via a wireframe mock-up.

SUMMARY OF THE INVENTION

Embodiments of the present invention comprise a method and system for accessing interface design elements via a wireframe mock-up. The method accessing element information describing one or more design elements, determining a location for one or more element links to be placed on a wireframe mock-up, populating the wireframe mock-up with the one or more element links, and providing the populated wireframe mock-up as an interface to access one or more design elements contained within the design element repository. The location is determined from the element information and the element link is placed in the determined location.

The system comprises a design element repository, a computer, and a client device. The design element repository comprises element information describing one or more design elements. The computer comprises a repository front end for determining one or more element link locations from the element information contained within the design element repository, populating a wireframe mock-up with the one or more link locations in accordance with the determined link locations, and providing the populated wireframe mock-up as an interface for accessing the one or more design elements. The client device receives the populated wireframe mock-up to access the design repository.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
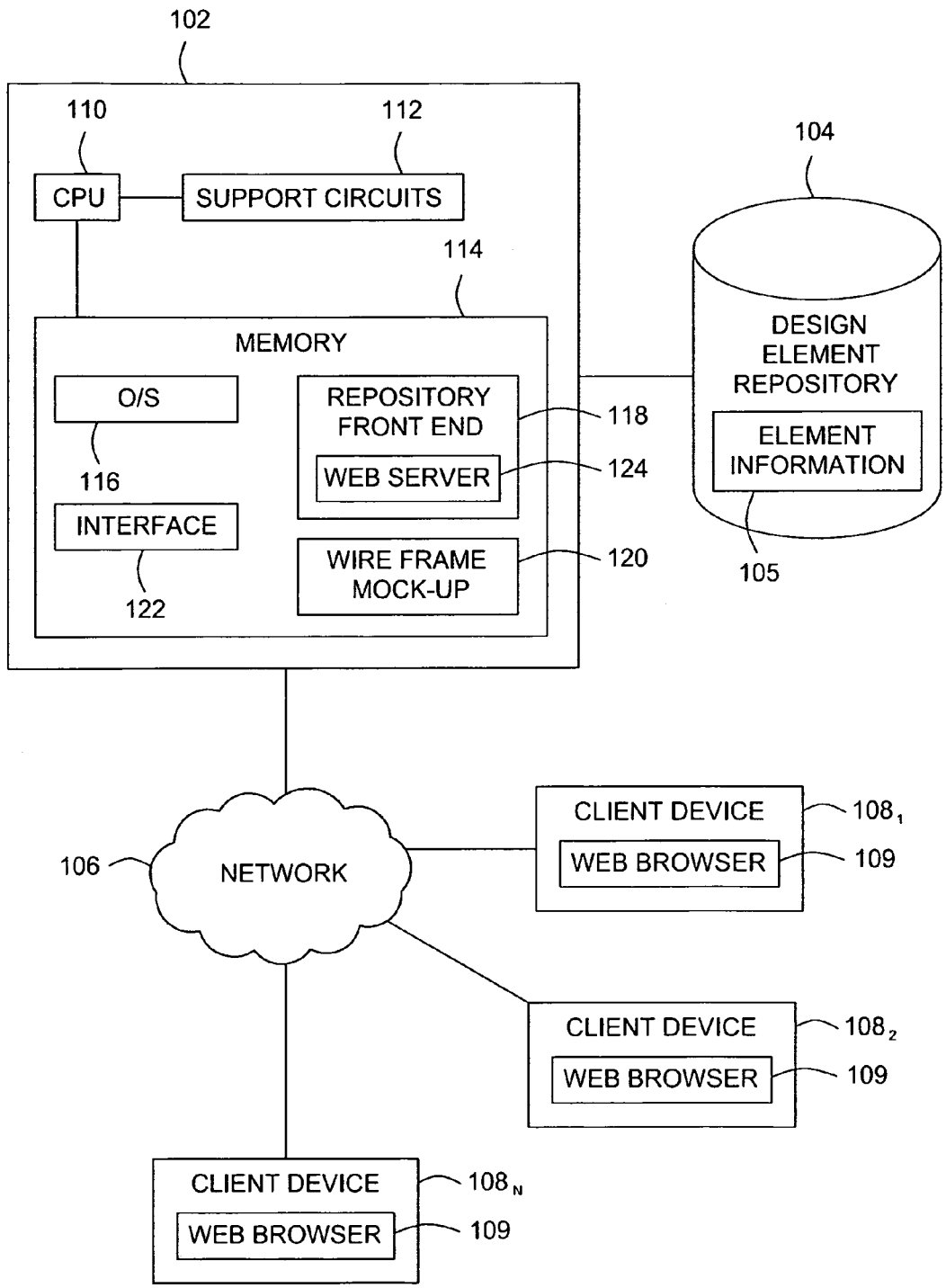
FIG. 1 is a block diagram depicting a system in which an embodiment of the present invention is used.

FIG. 1 is a block diagram depicting a system containing an embodiment of the present invention. The system 100 comprises a general purpose computer that operates as a specific purpose computer 102 coupled to a design element repository 104, a network 106 and one or more clients 108. The specific purpose computer 102 executes a repository front end 118 containing an embodiment of the present invention. The specific purpose computer 102 may operate as a server for the network 106 and the one or more clients 108. In operation, the system 100 provides an interface by which a user may browse interface design elements located within the design element repository 104.

The general purpose computer is a computing device such as those generally known in the art. The specific purpose computer 102 includes a central processing unit (CPU) 110, support circuits 112, and memory 114. The CPU 110 may comprise one or more commercially available microprocessors or microcontrollers that facilitate data processing and storage. The various support circuits 112 are utilized to facilitate the operation of the CPU 110 and include such circuits as clock circuits, power supplies, cache, input/output circuits and devices, and the like. The memory 114 may comprise random access memory, read only memory, removable storage, optical disk storage, disk drive storage, and combinations thereof. The memory 114 stores an operating system 116, a repository front end 118, a wireframe mock-up 120, and an interface 122. In operation, the CPU 110 executes the operating system 116 to control the general utilization and functionality of the host computer.

The memory 112 is comprised of a repository front end 118. The repository front end 118 is a software application that provides an interface for accessing data describing interface design elements contained within the design element repository 104. When executed by the CPU 110, the repository front end 118 causes the general purpose computer to behave as a specific purpose computer 102 for the purpose of providing an interface to access interface design elements. For the purposes of this application, the term "access" refers to retrieving new design elements, adding, editing, modifying, or deleting design element data and metadata, and the like.

In one embodiment, the repository front end 118 provides a web access for the clients 108 accessing the design element repository 104. As such, the front end 118 may include a web server 124 for providing the interface 122 to the clients 108. In some embodiments, the repository front end 118 may provide the interface 122 via a web hosted application such as ADOBE FLASH, JAVASCRIPT, MICROSOFT SILVERLIGHT, and the like. In other embodiments, the repository front end 118 may provide the interface 122 as a standard web page.

The front end 118 may also provide an interface for social networking links. For example, in one embodiment, the front end 118 allows a user to flag a particular design pattern for web networking sites such as DIGG, DEL.ICIO.US, STUMBLEUPON, and the like. In another embodiment, the user may access a Really Simple Syndication (RSS) feed for a design pattern so the user is notified when a pattern is updated. The front end 118 may also provide an interface for sending an email containing data about the interface element.

In one embodiment, the front end 118 may allow a user to log in with account credentials. The user may then specify configuration options unique to their account. The login credentials may further allow the user to save favorite patterns and pages, send private messages to other users, and post comments associated with their user credentials.

The wireframe mock-up 120 is an example model of an interface. In the context of interface design, a wireframe is a blueprint that defines an interface's content and functionality. A wireframe does not convey design. The wireframe mock-up 120 is viewable as a barebones skeleton of a stereotypical desktop or laptop interface, with no other design features added.

The repository front end 118 applies the contents of the design element repository 104 to the wireframe mock-up 120 to generate an interface 122. The interface 122 is displayed with the wireframe mock-up 120 with text links to descriptions of the design elements described in the design element repository 104. The text links are positioned in context-appropriate locations for the design element to which they are linked. For example, a design element describing the "Action Links" design element would be located on the left portion of the wireframe mock-up 120, in the position where interface components using the "Action Links" element would be present on a finished interface. Links to the design elements are placed in a manner that shows how the linked element would fit in the interface. This display is discussed in further detail with respect to FIG. 2.

The design element repository 104 is a database containing one or more design elements. The repository front end 118 allows for access to these elements. In one embodiment, the design repository 104 is a repository as disclosed in commonly-assigned U.S. patent application Ser. No. 12/584,757 which is herein incorporated by reference. The design element repository 104 comprises a set of element information 105. The element information 105 comprises descriptive data that defines one or more design elements, such as implementation instructions, example screen captures, functional definitions, sample code, and the like. In some embodiments, the design element repository 104 is located externally to the specific purpose computer 102 and connected via a network, such as the Internet. In an alternative embodiment, the design element repository 104 is present as an application and data located within the memory 114 of the specific purpose computer 102.

In sum, the specific purpose computer 102 provides the interface 122 to the repository 104 for the client devices 108. The client devices 108 request access to the repository 104 from the specific purpose computer 102 via the network 106. The client devices 108 may be any electronic device capable of providing and interacting with a graphical user interface, such as a personal computer, a cellular phone, a video game console, and the like. In one embodiment, the client devices 108 are personal computers and the network is the Internet. The client devices 108 may access the interface provided by repository front end 118 via a web browser 109. The client devices 108 provide access to a user for viewing and selecting elements of the interface. The interface may be displayed on the client devices 108 by a computer monitor, a video screen, a television, e-paper, and the like. The client devices 108 may comprise input devices such as a mouse, a keyboard, a joystick, a light pen, a touch-screen, and the like.

The specific purpose computer 102, executing the repository front end 118, creates a representation of the design element repository 104 suitable for viewing by the client 108. The representation takes the form of a wireframe mock-up 120. The repository front end 118 transmits this interface to the clients 108, such that the clients 108 may use the wireframe mock-up 120 to access the contents of the design element repository 104.

Figure 2:
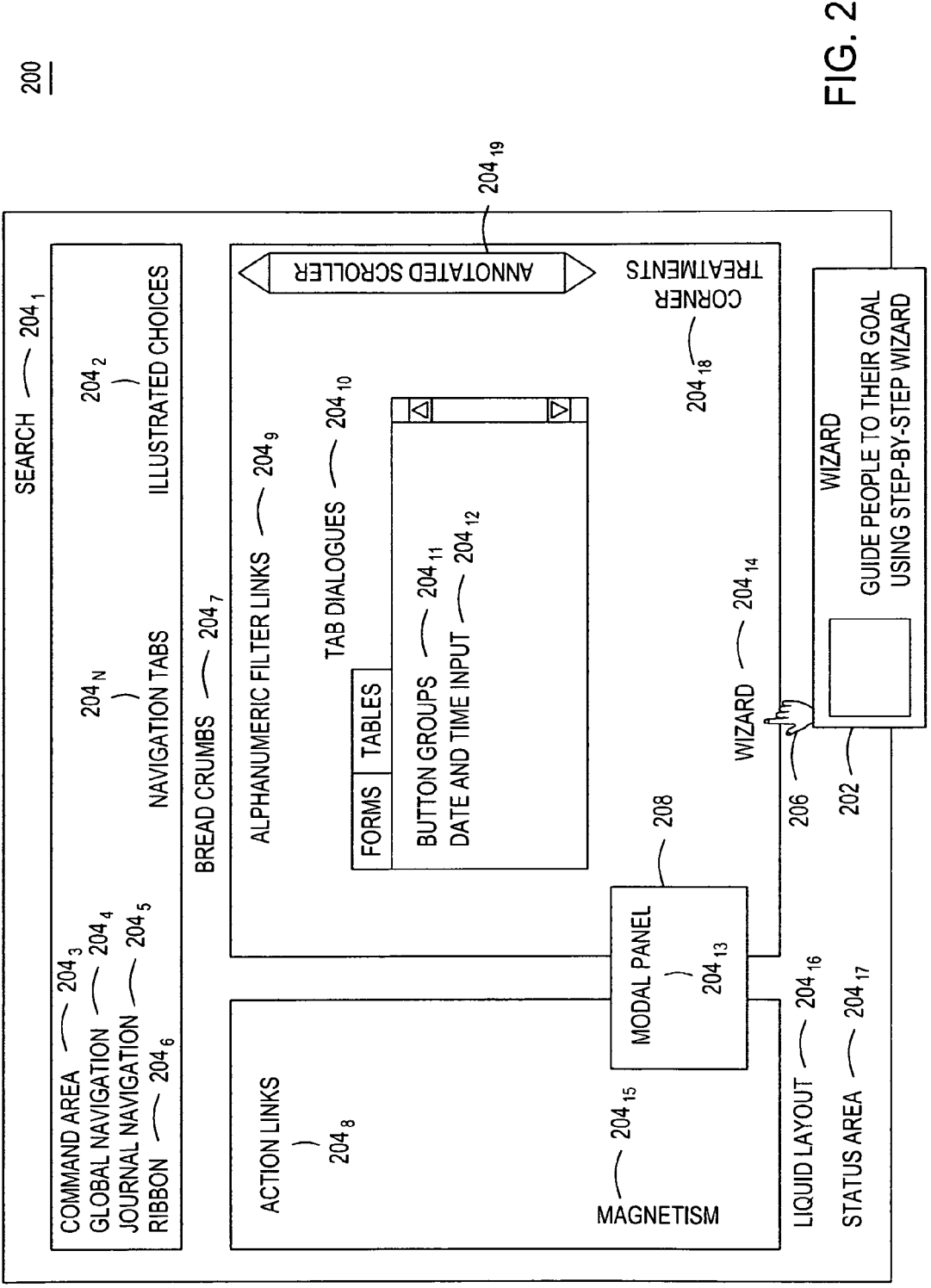
FIG. 2 is an illustration of a wireframe mock-up providing access to one or more interface design elements in accordance with an embodiment of the present invention.

FIG. 2 is an illustration depicting an interface 200 using a wireframe mock-up 120 in accordance with an embodiment of the present invention. The interface 200 is displayed as a sample interface comprised of a display window 202, links $204_1$, $204_2$, $204_n$, and a cursor 206. The sample interface provides a wireframe that appears familiar to anyone with experience in the art of interface development (i.e., the wireframe has common layout areas and screen elements).

The links $204_1$, $204_2$ ... $204_n$ depict the usage of the various design elements contained within the design element repository 104. For example, links 204 describing the navigation tabs, illustrated choices, and ribbon are placed at the top of the screen where such elements would usually be spatially located on a completed web page or interface, links 204 describing scroll bars are placed vertically on the side of the screen, and the like. A link 204 for each element contained within the repository 104 is displayed on this interface 200.

The links 204 to the design elements are located in contextual locations—e.g., some elements are most often implemented in certain areas of the view, so the links to those elements in this view are located in those areas. Links 204 are placed where such design elements would normally be found if or when they were used in an interface. Other elements are exemplified by parts of the wireframe—e.g., a modal dialog is shown to exemplify that element and the link to that element is located on that part of the wireframe. In this manner the interface 200 provides a streamlined way to access design elements that correspond to particular parts of an interface. Rather than relying on the user to remember a particular name or key word, the user may receive further detail about an element by the way the element is used within the interface.

Locating the elements in this manner offers several benefits. First, elements are found in their typical spatial locations. Second, users may discover alternatives to the element they may have had in mind by examining other links in similar locations. Third, the interface allows the user to learn about the various possible elements in a visual, spatial, and associative manner.

The cursor 206 moves in accordance with commands input by a user via an input device such as a keyboard, mouse, tablet, light pen, and the like. When the cursor 206 is placed on a text link 204, but a selection operation (e.g. a mouse click) has not occurred, the display window 202 is shown. The display window 202 shows a brief summary of the design element corresponding to the text link 204 on which the cursor 206 is placed. In one embodiment, this further detail comprises the title of the design element, an example image of the element as it will appear in the interface, and a brief description of the element. In other embodiments, other information such as associated tags, comments, suggestions, and the like may be displayed.

When a selection operation is performed on a text link 204 (for example, a mouse click), the interface 200 displays a detailed view of the selected design element. This detail view may include example screen captures, implementation instructions, user comment features, and/or other resources as known in the art to implement the given design element within the interface. In one embodiment, the detail view is a "pop-up" or "pop-out" window displayed on top of the interface. In another embodiment, the detail view is a separate page that the web browser navigates to in response to the selection operation. One embodiment of a detailed view of a design element is described with respect to FIG. 4.

Displaying the interface elements in this manner provides several advantages over traditional indices which organize elements by name or by function. By displaying the elements as links on a wireframe mock-up in this manner, a set of common visual areas and elements are established. These visual areas are drawn in a recognizable way so that they are understandable to a UI designer or developer as a wireframe. Finding and selecting the proper element for the task at hand is faster and more intuitive than searching through an index of text links. The elements are listed where they fit into the wireframe, or, if there are too many to list, a mechanism for sorting through the overflow may be provided.

Figure 3:
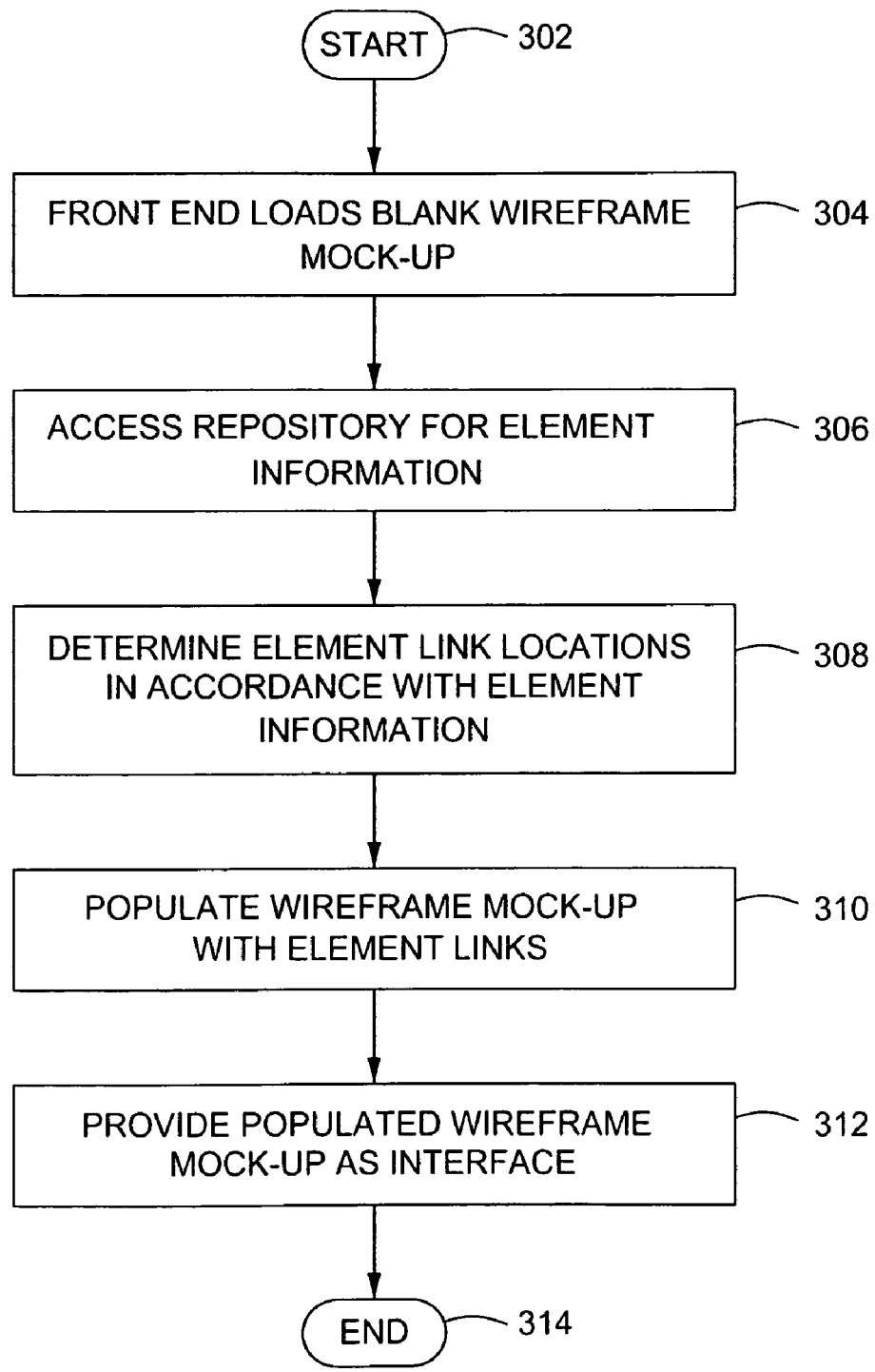
FIG. 3 is a flow diagram depicting a method for creating a wireframe mock-up used to provide access to one or more design elements in accordance with an embodiment of the present invention.

FIG. 3 is a flow diagram depicting a method 300 for populating a wireframe mock-up 120 to enable access to interface design elements in accordance with an embodiment of the present invention. The method begins at step 302, where a design repository 104 exists populated by one or more design elements. At step 304, the repository front end 118 begins with a wireframe mock-up 120 of a sample interface. The wireframe mock-up 120 illustrates a sample layout for a web page or other desktop or laptop interface, using different shapes (such as boxes, ovals, and diamonds) to represent content, functional, and navigational elements and show their placement on the page. HTML coders use the diagrams to "wire" each page, connecting links, attaching content, and so on. In the present embodiment, a simple wireframe with different boxes to denote different portions of the interface is used. However, one of ordinary skill in the art would recognize that other types of wireframes could be used in embodiments of the present invention. It would also be trivial to allow a user to select an alternate wireframe from a selection list prior to construction of the mock-up. At this step, the unpopulated wireframe mock-up 120 consists of a blank page with outlines corresponding to various areas of the interface. This page may be encoded in various languages as known in the art, such as Hyper Text Mark-up Language (HTML), JAVASCRIPT, SHOCKWAVE FLASH, and the like.

At step 306, the repository front end 118 accesses the design element repository 104 to determine information describing the design elements contained within the repository 104. This element information 105 comprises various data structures defining the proper use of the associated element. In one embodiment, this information may comprise one or more text fields describing the proper placement and implementation of the design element. In another embodiment, the element information 105 may comprise specific instructions for the placement of the link to the design element on the wireframe mock-up 120. In yet another embodiment, the element information 105 may comprise a set of tags which define the functional use of the pattern. In yet another embodiment, the element information 105 may comprise tags describing the element's relationship to other elements. The element information 105 may contain one or more of a set of coordinates, a screen location, a functional use of the associated design element, a contextual use of the associated design element, and a set of related design elements.

At step 308, the repository front end 118 determines the location of each element link 204 within the wireframe mock-up 120. The links 204 are placed on the wireframe mock-up 120 in spatial and contextual locations as defined in the element information 105. In one embodiment, the element information 105 contains specific spatial (e.g. X and Y location) coordinates for placement of the text link on the wireframe mock-up 120. In another embodiment, the element information 105 contains a general spatial location (e.g. left side of the screen, title bar, modal panel, etc.) for the associated pattern, and the front end 118 sorts the elements into portions of the screen as appropriate for their spatial location.

In yet another embodiment, the element information 105 contains functional attributes of the associated design element and the front end 118 groups elements with common functionality elements in a spatially appropriate location. For example, elements relating to searching on a web page may be organized near the top of the wireframe mock-up 120, or elements associated with scroll-bar elements may be located vertically along the side of the wireframe mock-up 120.

At step 310, the front end 118 populates the wireframe mock-up 120 with the element links 204 in the locations as determined during step 308. In one embodiment, the front end 118 modifies the page used to display the wireframe mock-up 120 by inserting code describing the element links 204. In another embodiment, the wireframe mock-up 120 is used as a background and an overlay containing the element links 204 is applied, such that the wireframe mock-up does not need to be directly modified.

At step 312, the populated wireframe mock-up is provided as an interface 122 for accessing the elements contained within the design element repository 104. The client device 108 may then perform selection operations on the element links 204 to access the design element to which the link is associated. In one embodiment, the web server 124 provides the interface 122 to the client devices 108 as a web page. In one embodiment, the interface 122 is implemented as an HTML page. In other embodiments, the interface 122 is provided as executed or interpreted code, such as JAVASCRIPT and the like. In yet another embodiment, the interface 122 is provided as an application executing in a browser plug-in such as MICROSOFT SILVERLIGHT, ADOBE FLASH, and the like.

The method ends at step 314 with the completed interface 122 being available to access the elements contained within the design element repository 104.

Figure 4:
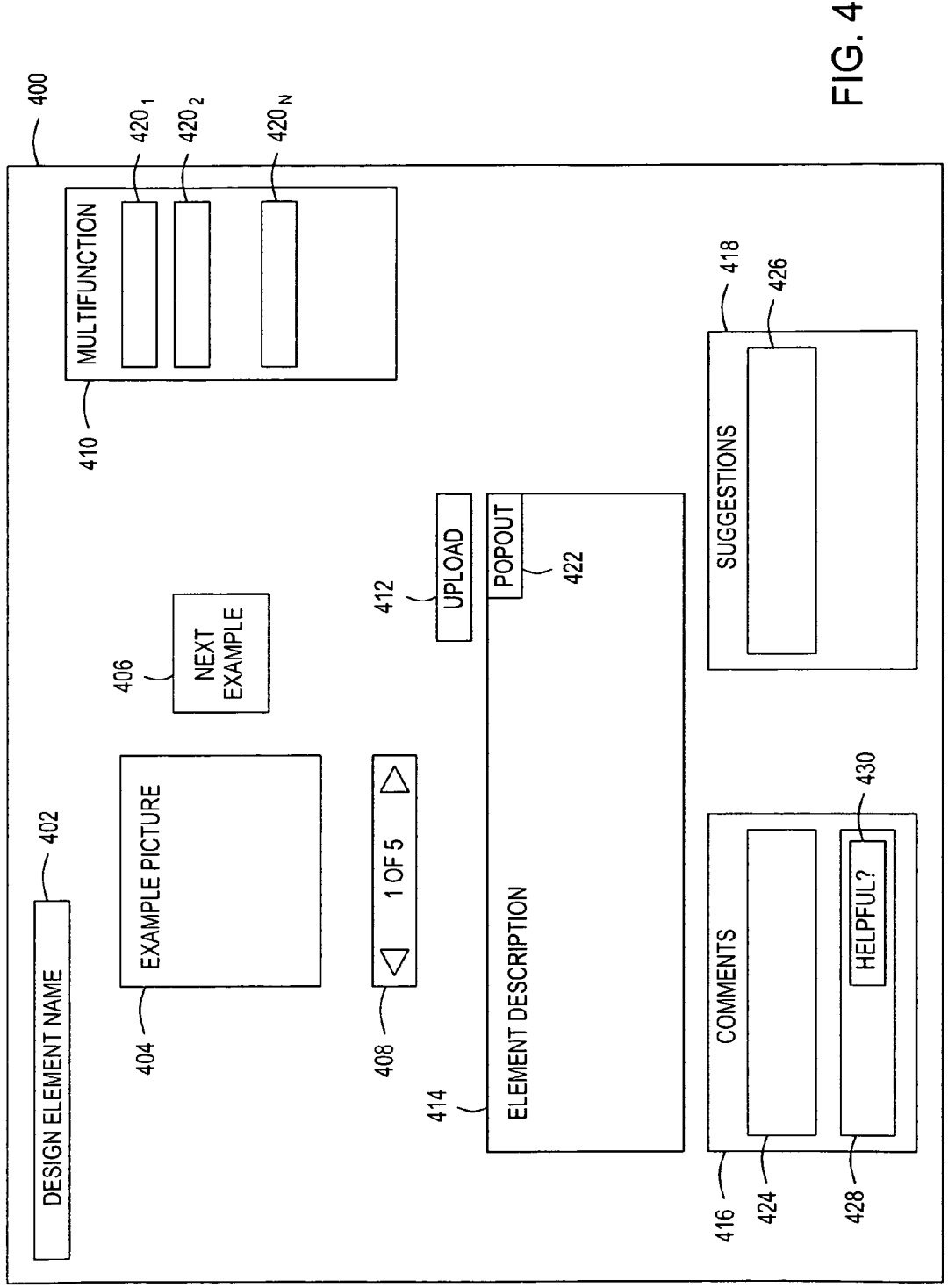
FIG. 4 is an illustration of a detailed design element view page for viewing characteristics of an individual design element in accordance with an embodiment of the present invention.

FIG. 4 is an illustration of a viewing interface 400 for viewing a design element in accordance with an embodiment of the present invention. In one embodiment, this interface 400 may be provided to the client device 108 as a separate web page. In another embodiment, the view is a window within an application executing from within the client web browser 109. The viewing interface 400 illustrates the detailed view of a selected design element. The viewing interface 400 is generated by the front end 118 using the data stored within the design element repository 104. The interface 400 is then sent to the client 106.

In one embodiment, the viewing interface 400 comprises a design element name 402, an example picture 404, a next example 406, an example selector 408, a multifunction box 410, an example upload box 412, an element description 414, a comments box 416, and a suggestions box 418.

The design element name 402 is a text field that includes the name of the design element described in the viewing interface 400. The example picture 804 shows a sample screen capture or illustration of the design element in use. The next example 406 is a small representation of the next image to be displayed. The example selector 408 chooses which example illustration to display within the example picture box 404. The example selector 408 includes arrows for displaying different images within the example picture box 404.

The multifunction box 410 allows a user to perform multiple applications, such as flagging the particular design pattern for DIGG, DEL.ICIO.US, STUMBLEUPON, and other link aggregation websites. The multifunction box 410 may also include links to subscribe to RSS feeds about different aspects of the element. These functions are performed by selecting links 420₁, 420₂, . . . , 420ₙ located within the multifunction box.

The element description 414 contains text describing the proper way to implement the selected design element. This description 414 may include implementation details, situations where the element would be helpful, sample code, and/or other information needed to implement the selected design pattern. The element description 414 may include a pop out link 422 to display the text of the field in a separate window.

The comments box 416 allows a user to read and upload comments about the selected design. The entry field 424 allows the user to enter text describing their experience with the selected design pattern. After the text is submitted within the entry field 424, it will be displayed in a display field 428. The display field 428 may optionally include a comment review feature 430 allowing the user to select whether the particular comment was helpful.

The suggestion field 418 allows users to upload improvement suggestions for the selected design element. The suggestion field 418 includes similar fields to the comments box 416, such as a data entry field 426 and a display field.

While the foregoing is directed to embodiments of the present invention, other and further embodiments of the invention may be devised without departing from the basic scope thereof, and the scope thereof is determined by the claims that follow.

The invention claimed is:

1. A computer implemented method for accessing interface design elements, at least a portion of the method being performed by a computer system comprising at least one processor, the method comprising:
   accessing element information describing one or more visual design elements;
   determining a location for one or more element links to be placed on a visual wireframe mock-up, wherein the location is determined from the element information and corresponds to contextual location information where the one or more visual design elements are located in an interface;
   populating the wireframe mock-up with the one or more element links, wherein the element link is placed in the determined location; and
   providing the populated wireframe mock-up as the interface to access one or more design elements contained within the design element repository.

2. The method of claim 1, further comprising embedding the populated wireframe mock-up within a web page.

3. The method of claim 2, further comprising hosting the web page comprising the populated mock-up.

4. The method of claim 1, wherein the element information comprises at least one of a set of coordinates, a screen location, a functional use, a contextual use, and a set of related design elements.

5. The method of claim 1, further comprising serving a page containing a detailed description of a design element in response to a selection operation performed on an element link contained within the populated wireframe mock-up.

6. An apparatus for accessing visual interface design elements comprising:
   means for accessing element information contained within a design element repository;
   means for determining a location for one or more element links from the element information and the location corresponds to contextual location information where the one or more visual design elements are located in an interface;
   means for populating a visual wireframe mock-up with the one or more element links, wherein the element links are placed in the determined location; and
   means for providing the populated wireframe mock-up as an interface to access the one or more design elements contained within the design element repository.

7. The apparatus of claim 6, further comprising means for embedding the populated wireframe mock-up within a web page.

8. The apparatus of claim 7, further comprising means for hosting the web page comprising the populated wireframe mock-up.

9. The apparatus of claim 6, wherein the element information comprises at least one of a set of coordinates, a screen location, a functional use, a contextual use, and a set of related design elements.

10. The apparatus of claim 6, further comprising means for serving a page containing a detailed description of a design element in response to a selection operation performed on an element link contained within the populated wireframe mock-up.

11. A system for accessing interface design elements comprising:
   a design element repository comprising element information describing one or more visual design elements;
   a computer comprising a repository front end, determining one or more element link locations from the element information contained within the design element repository, the location corresponding to contextual location information where the one or more visual design elements are located in an interface, populating a visual wireframe mock-up with the one or more link locations in accordance with the determined link locations, and providing the populated wireframe mock-up as an interface for accessing the one or more design elements; and
   a client device for receiving the populated wireframe mock-up to access the design repository.

12. The system of claim 11, wherein the computer embeds the populated wireframe mock-up within a web page.

13. The system of claim 12, wherein the computer hosts the web page embedded with the populated wireframe mock-up.

14. The system of claim 11, wherein the element information comprises at least one of a set of coordinates, a screen location, a functional use, a contextual use, and a set of related design elements.

15. The system of claim 11, wherein the computer serves a page containing a detailed description of a design element in response to a selection operation performed on an element link contained within the populated wireframe mock-up.

* * * * *